No. 740,331. PATENTED SEPT. 29, 1903.
S. STITTS.
TROLLEY.
APPLICATION FILED FEB. 3, 1903.
NO MODEL.
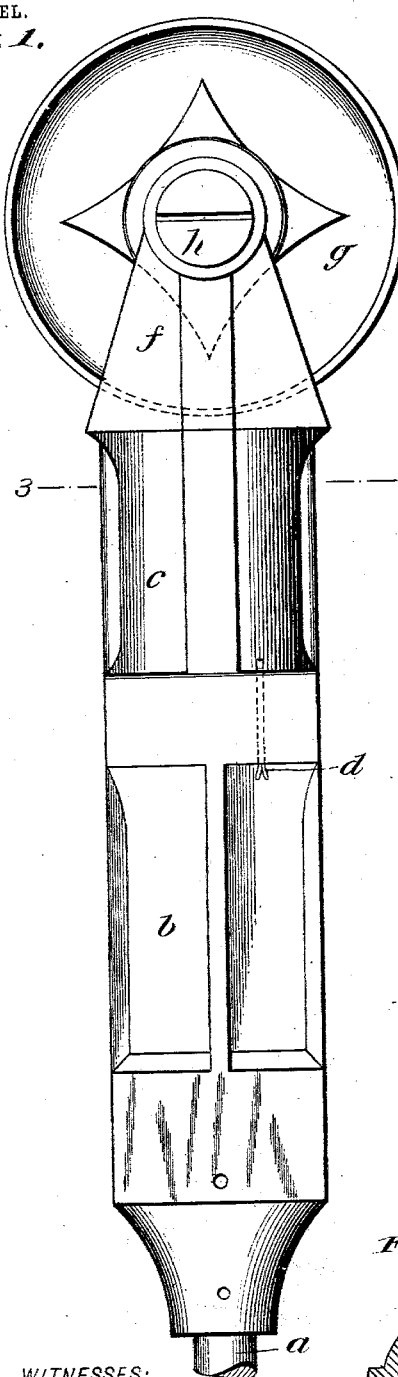
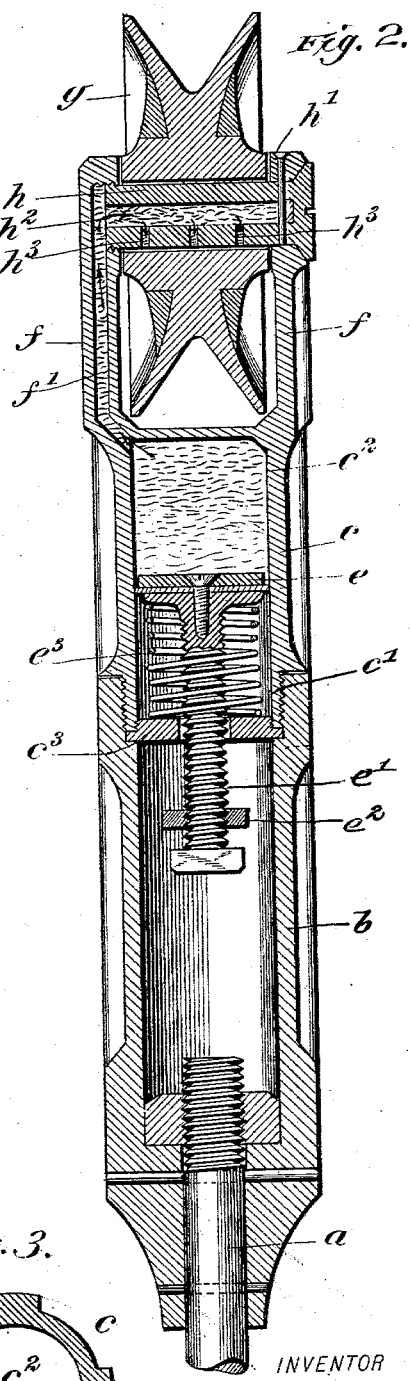
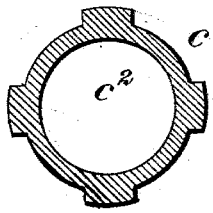
WITNESSES:
Paul Hunter
Isaac B. Owens.
INVENTOR
Sylvester Stitts
BY
ATTORNEYS.

No. 740,331. Patented September 29, 1903.

UNITED STATES PATENT OFFICE.

SYLVESTER STITTS, OF IRONTON, OHIO, ASSIGNOR TO HIMSELF, MERRILL G. FEARON, AND ROBERT N. FEARON, OF IRONTON, OHIO.

TROLLEY.

SPECIFICATION forming part of Letters Patent No. 740,331, dated September 29, 1903.

Application filed February 3, 1903. Serial No. 141,629. (No model.)

*To all whom it may concern:*

Be it known that I, SYLVESTER STITTS, a citizen of the United States, and a resident of Ironton, in the county of Lawrence and State of Ohio, have invented a new and Improved Trolley, of which the following is a full, clear, and exact description.

This invention relates to a means for facilitating the lubrication of trolley-wheels; and it comprises certain novel devices enabling grease or any other lubricant to be used and to be pressed steadily into the bearing of the trolley-wheel, thus keeping the wheel constantly lubricated.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side elevation of the invention. Fig. 2 is a longitudinal section thereof, and Fig. 3 is a section on the line 3 3 of Fig. 1.

$a$ indicates the trolley-pole, which is securely fastened into a hollow harp-section $b$. Said section $b$ is open at the end opposite the pole $a$ and is screw-threaded thereat to receive the threaded portion $c'$ of the outer or second harp-section $c$. Cotter-pins or other readily-removable fastening devices $d$ (see Fig. 1) are employed for holding the parts $b$ and $c$ against disconnection. In the outer harp-section $c$ is formed a grease-chamber $c^2$, and working in this chamber is a piston or follower $e$, the stem $e'$ of which is threaded, as shown, and passes loosely through a closure $c^3$ in the lower or inner end of the harp-section $c$.

$e^2$ indicates a nut working on the threaded stem $e'$, and $e^3$ indicates a spring-bearing between the follower $e$ and the closure $c^3$. The nut $e^2$ limits the inward movement of the follower. Projecting longitudinally from the outer harp-section $c$ are two arms $f$, one of which (according to the present construction the left-hand arm in Fig. 2) is formed with a duct $f'$ passing through it and leading from the grease-chamber $c^2$ to the outer end of the arm.

$g$ indicates the trolley-wheel, and $h$ the axle thereof. This axle projects between the arms $f$ and is securely fastened therein by a pin $h'$, connecting the right-hand arm $f$ and axle $h$. Said axle is formed with a longitudinal passage $h^2$, which opens at the left-hand end of the axle, and said left-hand end is screwed or otherwise fastened to the left-hand arm $f$, so that the passage $h^2$ communicates with and, indeed, forms a continuation of the passage $f'$. The axle $h$ also has a series of transverse passages $h^3$ passing from the passage $h^2$ laterally to the outer side of the axle, so as to lead the grease or other lubricant into the bearing of the trolley-wheel. The duct $f'$ may be provided with any suitable means for regulating the amount of grease forced therethrough, this means being, for example, after the nature of a needle-valve or the like operating in the duct. Contact is made from the ends of the wheel-hub to the respective arms $f$ and thence through the harp-sections to the pole $a$ or to any other suitable conductor.

In order to fill the grease cup or chamber $c^2$, it is only necessary to disconnect the sections $b$ and $c$, unscrew the closure $c^3$, and draw out the follower $e$, with the parts attached thereto. After filling the chamber $c^2$ the screw-stem $e'$ should be turned in the nut $e^2$, so as to move and hold the follower $e$ in close proximity with the closure $c^3$. When this is done, the closure should be again applied, as shown in Fig. 2, and then the nut $e^2$ should be screwed back toward the lower end of the stem $e'$, thus rendering the nut inactive and allowing the spring $e^3$ to exert a steady pressure on the grease or other lubricant and force the same continually through the duct $f'$ to the trolley-wheel.

It will be understood that while the device is adapted especially for use in connection with grease or semifluid lubricants it may nevertheless be used for heavy oils, all of which will suggest itself to skilled mechanics.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of a trolley-wheel, a harp on which the wheel is mounted, said harp being formed in two sections having removable connection with each other and the section carrying the harp having a lubricant-chamber therein and a duct leading from the lubricant-chamber to the wheel-bearing, a follower mounted to move in the lubricant-chamber, a stem connected with the follower and projecting past the inner end of the harp-section having the lubricant-chamber into a cavity in the other harp-section, and a spring pressing the follower.

2. The combination of a hollow inner harp-section, an outer harp-section having a lubricant-chamber therein and removably connected with the inner section, a closure for the inner end of the lubricant-chamber, a follower in the lubricant-chamber, a stem connected with the follower and projecting through said closure, a spring pressing the follower, and a trolley-wheel mounted on the outer harp-section, said section having a duct extending from the lubricant-chamber to the bearing of the trolley-wheel.

3. The combination of a trolley-wheel, a harp on which the wheel is mounted, said harp having a lubricant-chamber and a passage leading from the chamber to the wheel-bearing, and means for exerting continuously a pressure on the lubricant to force it through the passage.

4. The combination of a trolley-wheel, a harp on which the wheel is mounted, said harp having a lubricant-chamber and a passage leading from the chamber to the wheel-bearing, means for exerting continuously a pressure on the lubricant to force it through the passage, such means comprising a follower, a stem attached thereto, a stop-nut on the stem, and a spring pressing the follower.

5. The combination of a trolley-harp having a lubricant-chamber therein, and an arm projecting from the harp, the harp also having a passage extending from the lubricant-chamber through the arm, a hollow axle held by the arm and having a lateral perforation, a trolley-wheel carried on the axle, and means for pressing continuously on the lubricant to force it into the hollow pin.

6. The combination of a trolley-harp in two sections one of which is hollow and open at one end, and said sections being connected at the open end of the hollow section, a trolley-wheel mounted on the harp, the harp having a passage leading from said hollow section to the wheel-bearing, a closure fastened in the open end of the hollow section, a follower working in the hollow section, and a spring acting between the follower and closure.

7. The combination of a trolley-harp formed in two sections, said sections being in longitudinal alinement with each other and joined together intermediate the ends of the harp, one of said sections being hollow and open at one end, and the sections being connected at the open end of the hollow section to inclose said open end, and a trolley-wheel mounted on the harp, the harp having a lubricating-passage extending from the hollow harp-section to the wheel-bearing, for the purpose specified.

In testimony whereof I have signed my name to this specification in the presence of two subscribing witnesses.

SYLVESTER STITTS.

Witnesses:
K. A. MILLER,
J. L. WINTERS.